United States Patent [19]
Leybourne, III

[11] 3,719,218
[45] March 6, 1973

[54] TIRE WITH BELT HAVING SCALLOPED EDGES

[75] Inventor: Allen E. Leybourne, III, Decator, Ala.

[73] Assignee: Monsanto Company, St. Louis, Mo.

[22] Filed: March 8, 1971

[21] Appl. No.: 121,647

[52] U.S. Cl. .............................................. 152/361
[51] Int. Cl. ............................................. B60c 9/18
[58] Field of Search ................... 152/361, 367, 357

[56] References Cited

UNITED STATES PATENTS

| | | |
|---|---|---|
| 2,947,339 | 8/1960 | Billingsley ........................... 152/361 |
| 3,310,093 | 3/1967 | Frazier ................................ 152/361 |
| 2,331,323 | 10/1943 | Jahant ................................. 152/357 |
| 3,242,965 | 3/1966 | Mirtain ............................... 152/361 |
| 1,800,178 | 4/1931 | Cooper et al. ....................... 152/367 |

Primary Examiner—Robert G. Sheridan
Assistant Examiner—George H. Libman
Attorney—Stanely M. Tarter, John W. Whisler, Neal E. Willis and Elmer J. Fischer

[57] ABSTRACT

Belted tires constructed with belt plies having less reinforcing cord at and near the edges thereof reduces the tendency for the plies to separate from the tire structure during vehicular use thereof.

5 Claims, 3 Drawing Figures

PATENTED MAR 6 1973

3,719,218

INVENTOR.
ALLEN E. LEYBOURNE, III

BY John W. Whisler

ATTORNEY

TIRE WITH BELT HAVING SCALLOPED EDGES

BACKGROUND OF THE INVENTION

The present invention relates to belted tires, i.e., radial and bias/belted tires. More particularly, the invention is concerned with the belts used in building belted tires.

Conventionally, belts consist of one or more narrow plies or layers of reinforcing cords which are placed directly under the tread in the crown of the tire. The cords of each ply being parallel and extending from one edge thereof to the other edge. The plies are so arranged that the cords extend across the tire at an angle (10° to 30°), the cords in each successive ply crossing at opposite angles. The angle is measured with respect to the center line of the tire.

During vehicular use of belted tires, the belt ply edges tend to separate from the tire creating a hazardous condition and resulting in tire failure. This characteristic is believed to be caused by one or more of the following factors:

1. the stiffness of the belt,
2. the modulus of the rubber stock of the tire changes in the shoulder region of the tire where the belt edges terminate,
3. during operation of belted tires the greatest amount of heat is generated in the shoulder region of the tires where the belt edges terminate and the structural stresses and strains are concentrated.

to reduce belt ply separation it has been the practice to arrange the plies in stepped relationship to avoid an abrupt termination of the belt at the edges. Generally, the narrowest ply is directly under the tread and each successive ply is wider than the preceding ply. Although this practice has been successful to some extent, further reduction of belt ply separation in belted tires is required in order to increase the durability and wearability thereof.

An object of the present invention is to provide an improved belt for use in the building of belted tires which reduces the tendency for the belt plies to separate from the tire structure during vehicular use of the tire.

Another object of the invention is to provide belted tires of increased safety, durability and wearability.

SUMMARY OF THE INVENTION

The foregoing objects of the invention are accomplished by providing belted tires having a circumferentially extending belt consisting of plies of rubber coated parallel cords, at least one of which and preferably all of which, have irregular-shaped edges, such as serrated, undulated (wave-like) or scalloped edges rather than conventional straight edges. Belts having serrated or undulated ply edges are characterized in having less cord at and near the edges thereof than elsewhere and in being more flexible than previous known belts. The increased flexibility of the belt will reduce the concentration of stresses and strains at the belt ply edges in the crown and shoulder regions of the tire. The stresses and strains are caused in part by the flexing of the belt edges during vehicular operation of the tire. Increased flexibility of the belt will also tend to reduce the build-up of heat at the belt ply edges and the tendency for the belt plies to separate from the tire structure. The foregoing features of the serrated- or undulated-edged belt will provided for the construction of longer wearing, more durable and safer belted tires than can be realized with the corresponding straight-edged belt.

DESCRIPTION OF THE PREFERRED EMBODIMENTS

Figure 1:
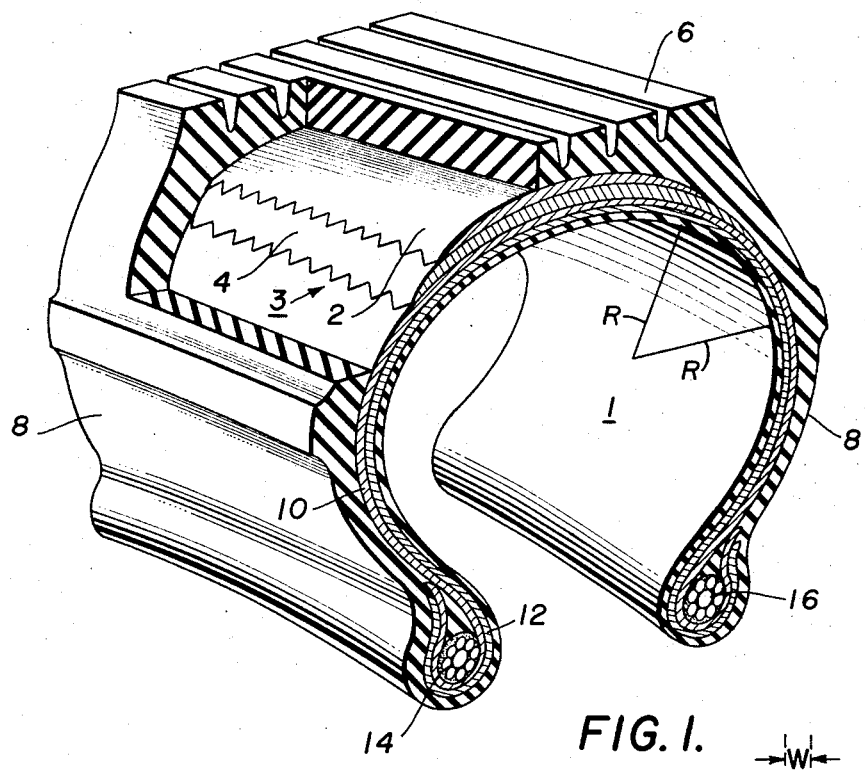
FIG. 1 is a perspective schematic in section showing a conventional bias/belted tire incorporating the belt of the present invention.

Referring to FIG. 1, a conventional bias/belted tire 1 is shown having a belt 3 consisting of plies 2 and 4 having edges shaped in accordance with the present invention. The tire also comprises carcass plies 10 and 12 extending from bead 14 to bead 16. Plies 2 and 4 of belt 3 are arranged in stepped relationship directly under tread 6 in the crown region of the tire and extend into the upper portion of sidewalls 8, i.e., the shoulder region of the tire having a radius R. Additional belt and/or carcass plies may be used in the construction of the tire if greater strength is required.

A critical feature which distinguishes the tires of the present invention from previously constructed tires is that the edges of the belt plies are serrated or undulated rather than straight. The serrated belt described herein may be employed in the construction of any belted tire. Thus, instead of the bias/belted tire shown in FIG. 1 belt 3 can also be used equally as effectively in building a radial tire. The construction and building of belted tires is well documented in the literature and accordingly is not discussed in detail herein.

Figure 2:
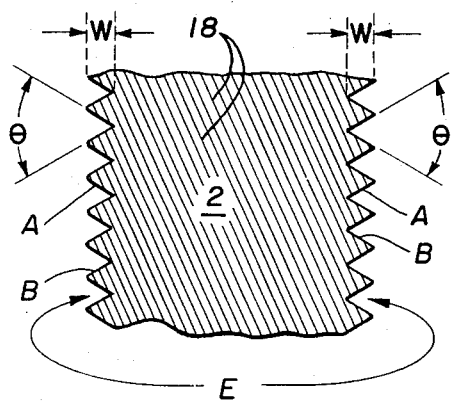
FIG. 2 is an enlarged plane view of a ply of the belt shown in FIG. 1 with parts removed to show the cord arrangement.

Ply 2 of belt 3 is shown in detail in FIG. 2 with cords exposed. Ply 2 has cords 18 which are parallel. The angle of the cord path to the center line of the tire is generally in the range of between 10° and 30° and at least 5° lower than the angle of the carcass cords which generally range between 25° and 45°. In a radial tire the angle of cords 18 is generally maintained between 10° and 20°. The edge E of ply 2 is serrated, i.e., sawtoothed, in appearance. As shown in FIG. 2, all of the serrations are identical and each has margins A and B which are of equal length and define angle $\theta$. The width $w$ of the serrations or undulations is determined by the formula $w=R/n$, wherein R is the radius of the shoulder of the tire and $n$ is a value between ⅓ and 3. If $n$ is less than ⅓, the increase in belt flexibility is of marginal significance. On the other hand, if $n$ is greater than 3, the stabilizing qualities of the belt tend to diminish.

As seen from FIG. 2, ply 2 by virtue of having serrated edges E contains less cord at the ply edges than elsewhere; edges E having a width $w$, as illustrated in FIG. 2. The reduction in cord at the edges of the ply renders the ply edges more flexible and thereby reduces the stiffness of the shoulder and the tendency for the ply edges to separate from the finished tire during vehicular operation thereof. Preferably, the belt plies are arranged in stepped relationship to further increase the flexibility of the belt, particularly, at the edges thereof.

Figure 3:
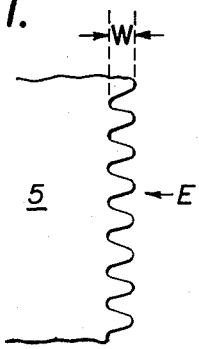
FIG. 3 illustrates a further embodiment of the present invention and is a sectional view of a ply having undulated edges; the undulations of each edge define a sinusoidal curve.

The shape of the serrations may be varied without departing from the scope of the invention. For example, the size of angle $\theta$ and the length of margins A and B may be selected from a wide range of values. Also, margins A and B need not be of equal length, e.g., margin A may be perpendicular to the center line of the tire. Further, as seen from FIG. 3, instead of providing serrated edges E of the plies, the edges may be undulated, e.g., sinusoidal. Preferably, the serrations or undulations are of uniform width, however, the width thereof may be varied, if desired. FIG. 3 shows a small section of a ply 5 having undulated edges E. The undulations of each edge define a sinusoidal curve.

Heretofore, tire belt plies have been cut from rubberized cord fabric with the cut being made along a straight line in such a manner that the path of the parallel cords in the plies is at a bias angle of about 10° to 30° as measured from the circumferential plane of the plies or the edges thereof. The belt plies of the present invention having serrated or undulated edges are preferably prepared in the same manner, with the exception that the cutting means used to cut the rubberized cord fabric into plies has a serrated or undulated edge. The resulting plies having serrated or undulated edges may then be used in the construction of any belted tire where straight-edged belt plies have been previously employed. The reinforcing cords of the plies may consist of natural, artificial or synthetic textile fibers, metal, glass, etc., for example, nylon, rayon, polyester, fiberglass and various metals such as brass coated steel wire.

Recently, belts have been made by winding one or more continuous lengths of cord onto a rotating support surface having an affinity for the cord, while employing cord guide means to traverse the rotating surface and adhesively secure the cord in a generally zigzag path thereon. It is contemplated that belts of the type described herein having less cord at the edges than elsewhere can be produced by this latter technique by controlling and manipulating said cord guide means.

I claim:

1. A belted tire having a tread, sidewalls and beads, carcass plies and a circumferentially extending belt under the tread and above the carcass plies, said belt comprising plies, each consisting of rubber-coated parallel cords which cross the tire at a bias angle with the cords of adjacent plies crossing the tire at an opposite angle, wherein at least one ply of said belt has edges extending into the shoulder region of said tire and wherein each ply of said belt has serrated edges, wherein the width of the serrations is equal to $R/n$, where R is the radius of the shoulder of said tire and n is a value between ⅓ and 3.

2. The tire of claim 1 wherein all of said serrations are substantially identical.

3. A belted tire having a tread, sidewalls and beads, carcass plies and a circumferentially extending belt under the tread and above the carcass plies, said belt comprising plies, each consisting of rubber-coated parallel cords which cross the tire at a bias angle with the cords of adjacent plies crossing the tire at an opposite angle, wherein at least one ply of said belt has edges extending into the shoulder region of said tire and wherein each ply of said belt has undulated edges, wherein the width of the undulations is equal to $R/n$, where R is the radius of the shoulder of said tire and n is a value between ⅓ and 3.

4. The tire of claim 3 wherein all the undulations are substantially identical.

5. The tire of claim 3, wherein the undulations define a sinusoidal curve.

* * * * *